US012223215B2

(12) United States Patent
Ito

(10) Patent No.: US 12,223,215 B2
(45) Date of Patent: Feb. 11, 2025

(54) IMAGE FORMING APPARATUS, INFORMATION PROCESSING APPARATUS, METHOD OF CONTROLLING IMAGE FORMING APPARATUS, AND METHOD OF CONTROLLING INFORMATION PROCESSING APPARATUS FOR PROCESSING A PDF PORTFOLIO

(71) Applicant: CANON KABUSHIKI KAISHA, Tokyo (JP)

(72) Inventor: Morikazu Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/540,366

(22) Filed: Dec. 14, 2023

(65) Prior Publication Data

US 2024/0201917 A1 Jun. 20, 2024

(30) Foreign Application Priority Data

Dec. 16, 2022 (JP) .................................. 2022-200898

(51) Int. Cl.
*G06F 3/12* (2006.01)
(52) U.S. Cl.
CPC ............ *G06F 3/128* (2013.01); *G06F 3/1238* (2013.01)
(58) Field of Classification Search
CPC .... G06F 3/1201; G06F 3/1238; G06F 3/1248; G06F 3/1278; G06F 3/128

USPC ......................................................... 358/1.15
See application file for complete search history.

(56) References Cited

U.S. PATENT DOCUMENTS

| | | | | |
|---|---|---|---|---|
| 2012/0203789 A1* | 8/2012 | Oishi | ...................... | G06F 16/84 707/754 |
| 2014/0118793 A1* | 5/2014 | Wyatt | ..................... | G06T 11/60 358/3.28 |
| 2014/0376035 A1* | 12/2014 | Niimura | ............. | H04N 1/00204 358/1.15 |
| 2018/0101525 A1* | 4/2018 | Hirata | ................... | G06F 16/955 |

FOREIGN PATENT DOCUMENTS

JP 2019164565 A 9/2019

* cited by examiner

*Primary Examiner* — Kent Yip
(74) *Attorney, Agent, or Firm* — Canon U.S.A., Inc. IP Division

(57) ABSTRACT

According to one embodiment, an image forming apparatus is provided that is connected to an information processing apparatus via a network. The image forming apparatus is capable of performing direct printing for PDF data, and the image forming apparatus includes at least one memory that stores a program; and at least one processor that execute the program to perform: notifying a user of information via mail in a case where print data received from the information processing apparatus is a PDF portfolio and it is not possible to perform direct printing for the PDF portfolio using the image forming apparatus, the information including a message indicating that printing should be performed using an application compatible with the PDF portfolio and a command to open the PDF portfolio using the application.

4 Claims, 16 Drawing Sheets

FIG. 7B

```
if exist C:\Program Files (x86)\Adobe\Acrobat DC\Acrobat\Acrobat.exe
(
C:\Program Files (x86)\Adobe\Acrobat DC\Acrobat\Acrobat.exe C:\Users\xxxxx\Documents\Portfolio.pdf
)
else
(
bitsadmin /transfer download "https://get.adobe.com/jp/reader/download?os=Windows+10&name=Reader+DC+2022.001.20169+Japanese+Windows%2864Bit%29&lang=jp&nativeOs=Windows+10&accepted=mss%2Cmsc&declined=&preinstalled=&site=landing" C:\Users\036639\Downloads\readerdc64_jp_ka_install.exe
C:\Users\xxxxx\Downloads\readerdc64_jp_ka_install.exe
C:\Program Files (x86)\Adobe\Acrobat DC\Acrobat\Acrobat.exe C:\Users\xxxxx\Documents\Portfolio.pdf
)
```

705

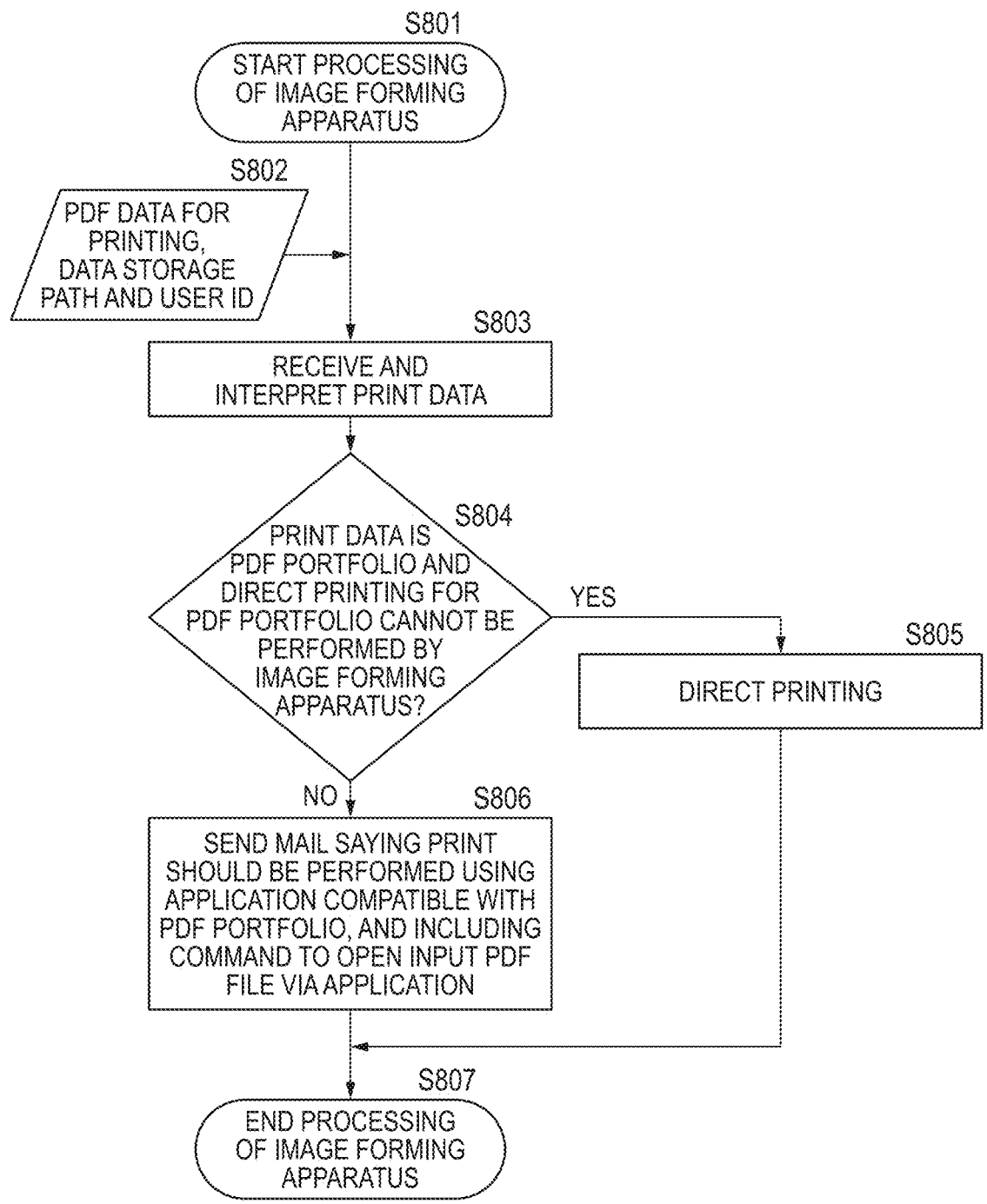

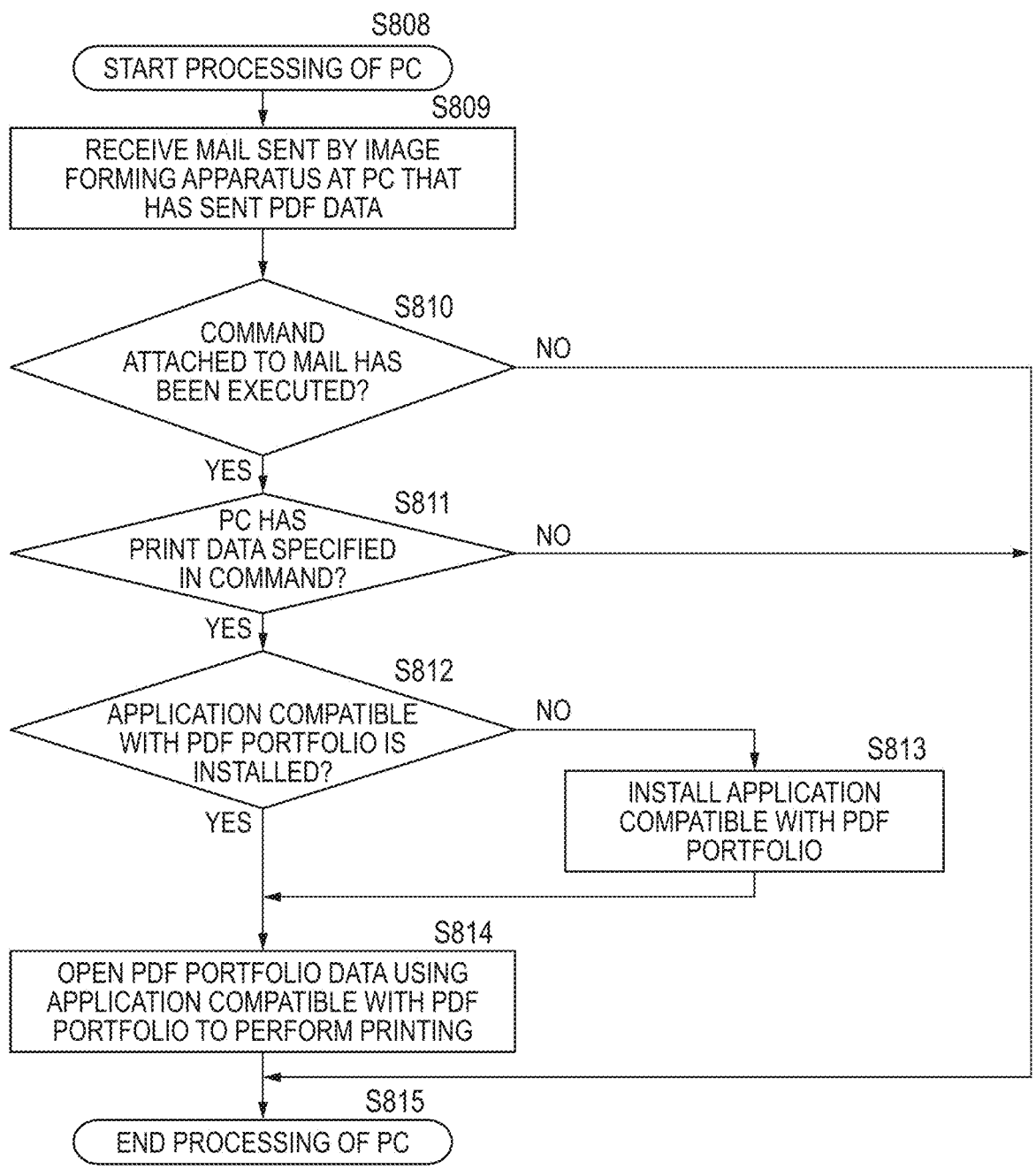

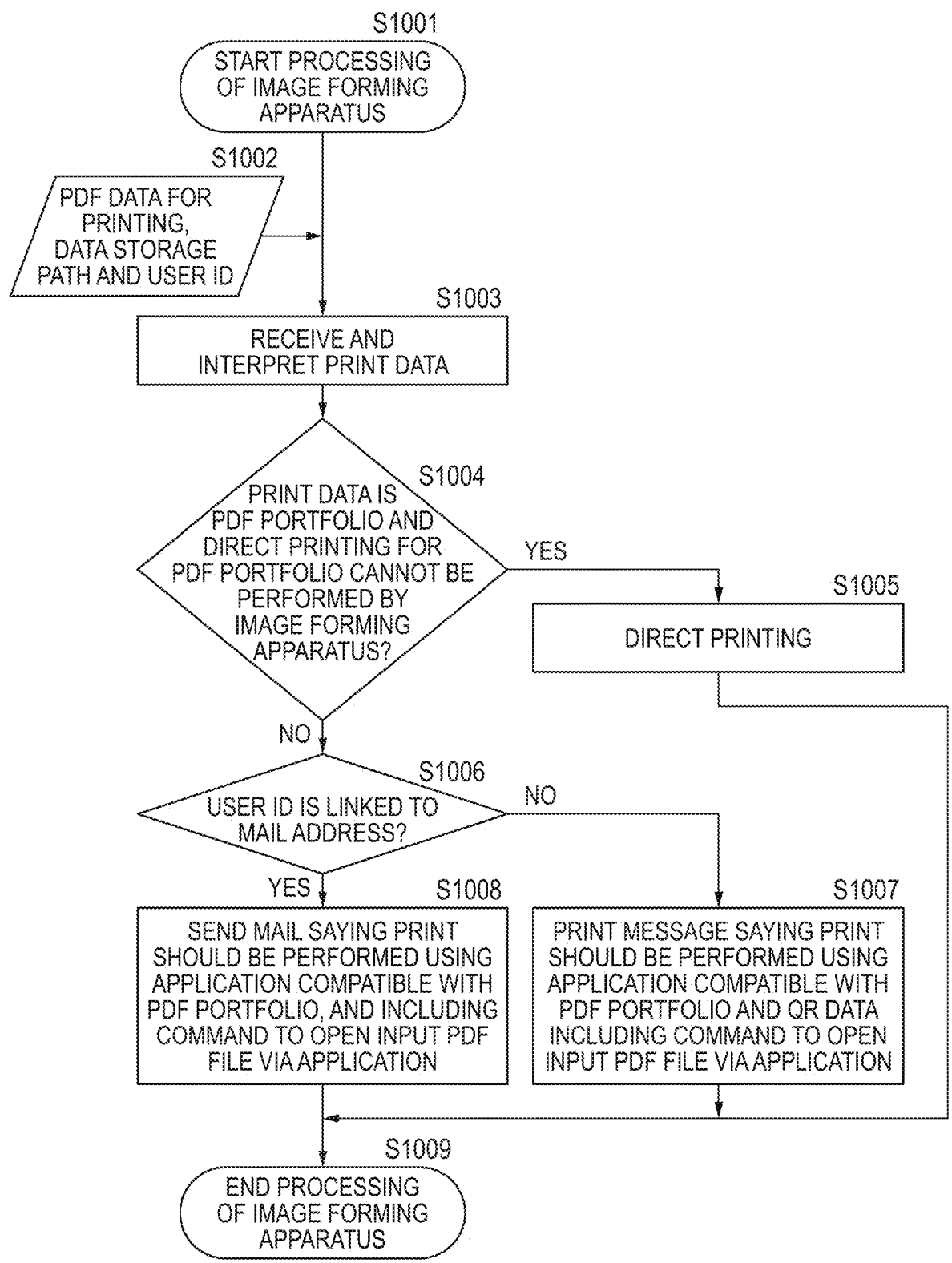

IMAGE FORMING APPARATUS, INFORMATION PROCESSING APPARATUS, METHOD OF CONTROLLING IMAGE FORMING APPARATUS, AND METHOD OF CONTROLLING INFORMATION PROCESSING APPARATUS FOR PROCESSING A PDF PORTFOLIO

BACKGROUND

Field

The present disclosure relates to an image forming apparatus having a PDF portfolio function and capable of direct printing of PDF data, an information processing apparatus connected to the image forming apparatus, a method of controlling the image forming apparatus, and a method of controlling the information processing apparatus.

Description of the Related Art

There is known a technology for directly sending a Portable Document Format (hereinafter referred to as PDF) file to an image forming apparatus without using a printer driver and printing the file. Hereinafter, this technology is referred to as PDF direct printing.

For example, a user can receive information from an image forming apparatus, specify a PDF file to be printed from an operation screen called a remote UI displayed on a PC, and perform PDF direct printing.

In addition, the user can perform PDF direct printing by copying a PDF in advance in a USB memory or the like and inserting the USB memory into the image forming apparatus.

The PDF has a function of integrating multiple files into one PDF unit. Files grouped into one PDF unit is hereinafter referred to as a "PDF portfolio". The PDF portfolio allows various file types created in different applications to be incorporated into one file.

Japanese Patent Application Laid-Open No. 2019-164565 discloses that it is determined whether or not an image included in a PDF portfolio can be processed, and image processing is not performed when it is determined that the image cannot be processed.

Japanese Patent Application Laid-Open No. 2019-164565 discloses processing of an image included in a PDF portfolio. However, Japanese Patent Application Laid-Open No. 2019-164565 does not teach processing when an error is generated during processing of a PDF portfolio.

For example, when a PDF interpreter installed in an image forming apparatus does not support a PDF portfolio, the image forming apparatus cannot perform PDF direct printing. However, the PDF file can be printed by opening the PDF file in the application on the PC and via the printer driver.

SUMMARY

According to various embodiments of the present disclosure, an image forming apparatus is provided that is connected to an information processing apparatus via a network. The image forming apparatus is capable of performing direct printing for PDF data, and the image forming apparatus comprises at least one memory that stores a program, and at least one processor that execute the program to perform: notifying a user of information via mail in a case where print data received from the information processing apparatus is a PDF portfolio and it is not possible to perform direct printing for the PDF portfolio using the image forming apparatus, the information including a message indicating that printing should be performed using an application compatible with the PDF portfolio and a command to open the PDF portfolio using the application.

According to various embodiments of the present disclosure, an information processing apparatus is provided that is connected to an image forming apparatus via a network. The information processing apparatus comprises at least one memory that stores a program, and at least one processor that execute the program to perform: executing a command included in information notified from the image forming apparatus; and opening, in a case where an application compatible with a PDF portfolio is installed, the PDF portfolio using the application to perform printing.

Further features of the present disclosure will become apparent from the following description of exemplary embodiments with reference to the attached drawings.

BRIEF DESCRIPTION OF THE DRAWINGS

FIG. 7B shows an example of a command transmitted from the image forming apparatus according to the first embodiment.

FIG. 8A shows processing executed by the image forming apparatus of the first embodiment in a case where a necessary application is not installed.

FIG. 8B shows processing executed by the personal computer of the first embodiment in a case where a necessary application is not installed.

FIG. 10A shows processing executed by the image forming apparatus according to the third embodiment in a case where a password is required for printing.

DESCRIPTION OF THE EMBODIMENTS

Hereinafter, embodiments of the present disclosure will be described with reference to the accompanying drawings.

First Embodiment

Overall Configuration of Printing System

Figure 1:
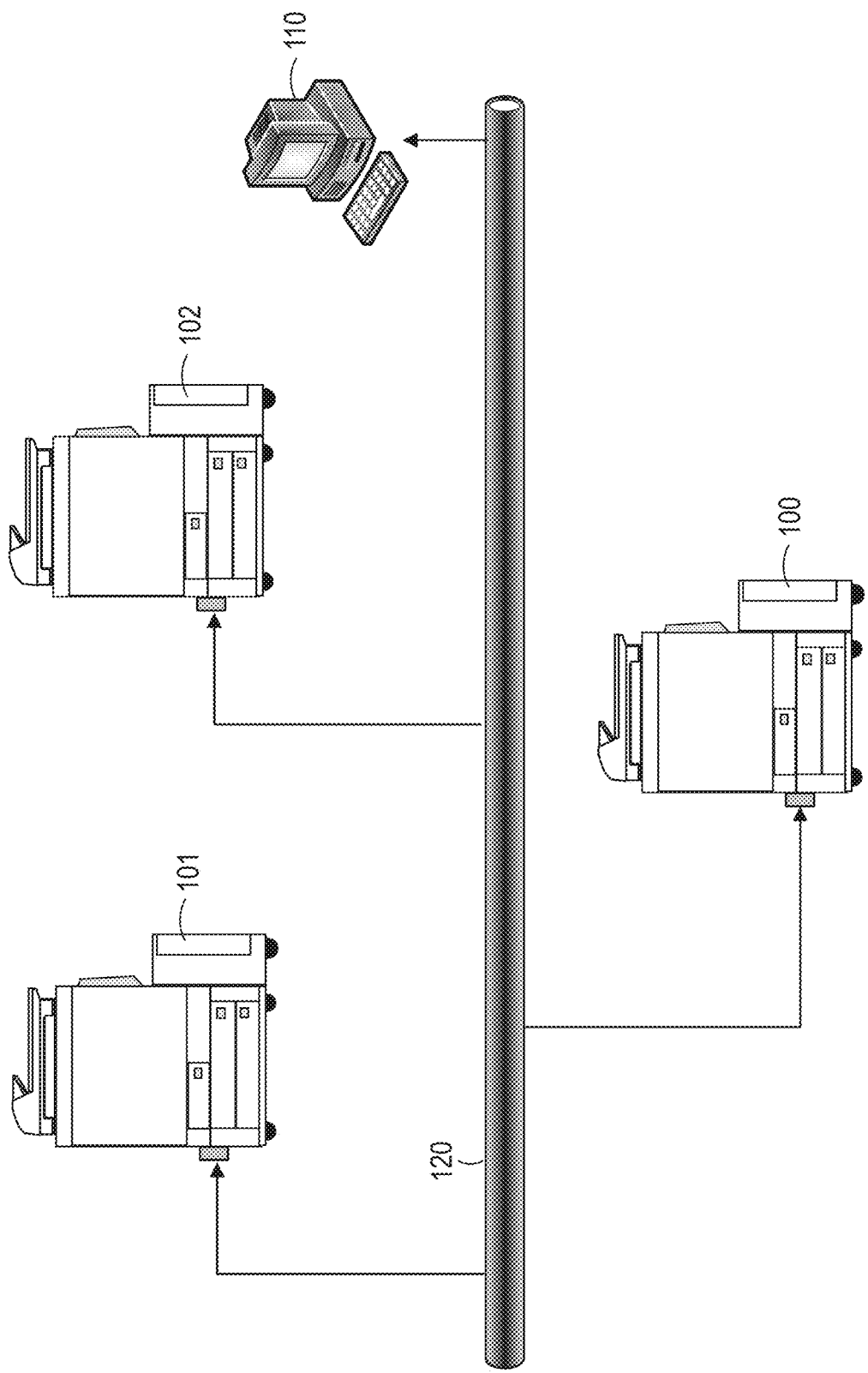
FIG. 1 shows a configuration of the printing system according to the first embodiment.

Referring to FIG. 1, the configuration of the printing system according to the present embodiment is described below.

The printing system according to the present embodiment includes image forming apparatuses 100, 101, 102, a personal computer (PC) 110, and a network 120. The image forming apparatuses 100 to 102 are connected to the network 120. The image forming apparatuses 100 to 102 can communicate with the PC 110, which is an information processing apparatus, and an external apparatus via the network 120.

The PC 110 transmits print data to the image forming apparatuses 100 to 102 via the network 120.

The image forming apparatuses 100 to 102 that have received the print data execute print processing based on the received print data. For simplifying the descriptions of the image forming apparatuses 100 to 102, the operation and processing of the image forming apparatus 100 will be described below.

Hardware Configuration (Image Forming Apparatus)

The configuration of the image forming apparatus 100 will be described below with reference to FIG. 2.

A multifunction peripheral (MFP) is considered as the image forming apparatus 100 of the present embodiment. However, the image forming apparatus 100 may be a printer having no scanner function.

The image forming apparatus 100 includes a printer 207, a scanner 209, an operation unit 211, and a control unit 220. The control unit 220 includes a bus 200, a CPU 201, a ROM 202, a RAM 203, an HDD 204, a printer I/F 206, a scanner I/F 208, an operation unit I/F 210, a network I/F 212, and a USB I/F 213. The CPU 201 reads out a control program stored in the ROM 202 and executes various processes for controlling the operation of the image forming apparatus 100. The CPU 201 is connected to other units via a bus 200.

The ROM 202 stores a control program.

The RAM 203 is used as a temporary storage area such as a main memory and a work area of the CPU 201.

The HDD 204 stores various data including print data and scan images.

In the image forming apparatus 100, one CPU 201 can execute each process shown in the flowcharts described later. However, the image forming apparatus 100 may have a different configuration. For example, in the image forming apparatus 100, multiple CPUs can cooperate to perform each process shown in the flowcharts described later.

The printer I/F 206 connects the printer 207 and the bus 200.

The printer 207 executes print processing based on print data received from an external device and a scan image generated by the scanner 209.

The scanner I/F 208 connects the scanner 209 and the bus 200.

The scanner 209 reads a document and generates a scan image. The scan image generated by the scanner 209 may be printed by the printer 207 or stored in the HDD 204.

The operation unit I/F 210 connects the operation unit 211 and the bus 200. The operation unit 211 includes a liquid crystal display unit having a touch panel function or a keyboard, and displays an operation screen. A user can input instructions and information to the image forming apparatus 100 via the operation unit 211.

The network I/F 212 is connected to the network 120 and communicates with an external device through the network. The network I/F 212 receives print data transmitted from an external device. The printer 207 executes print processing based on the received print data.

The bus 200, the CPU 201, the ROM 202, the RAM 203, the HDD 204, the printer I/F 206, the scanner I/F 208, the operation unit I/F 210, and the network I/F 212 are collectively referred to as the control unit 220.

Hardware Configuration (PC)

Figure 3:
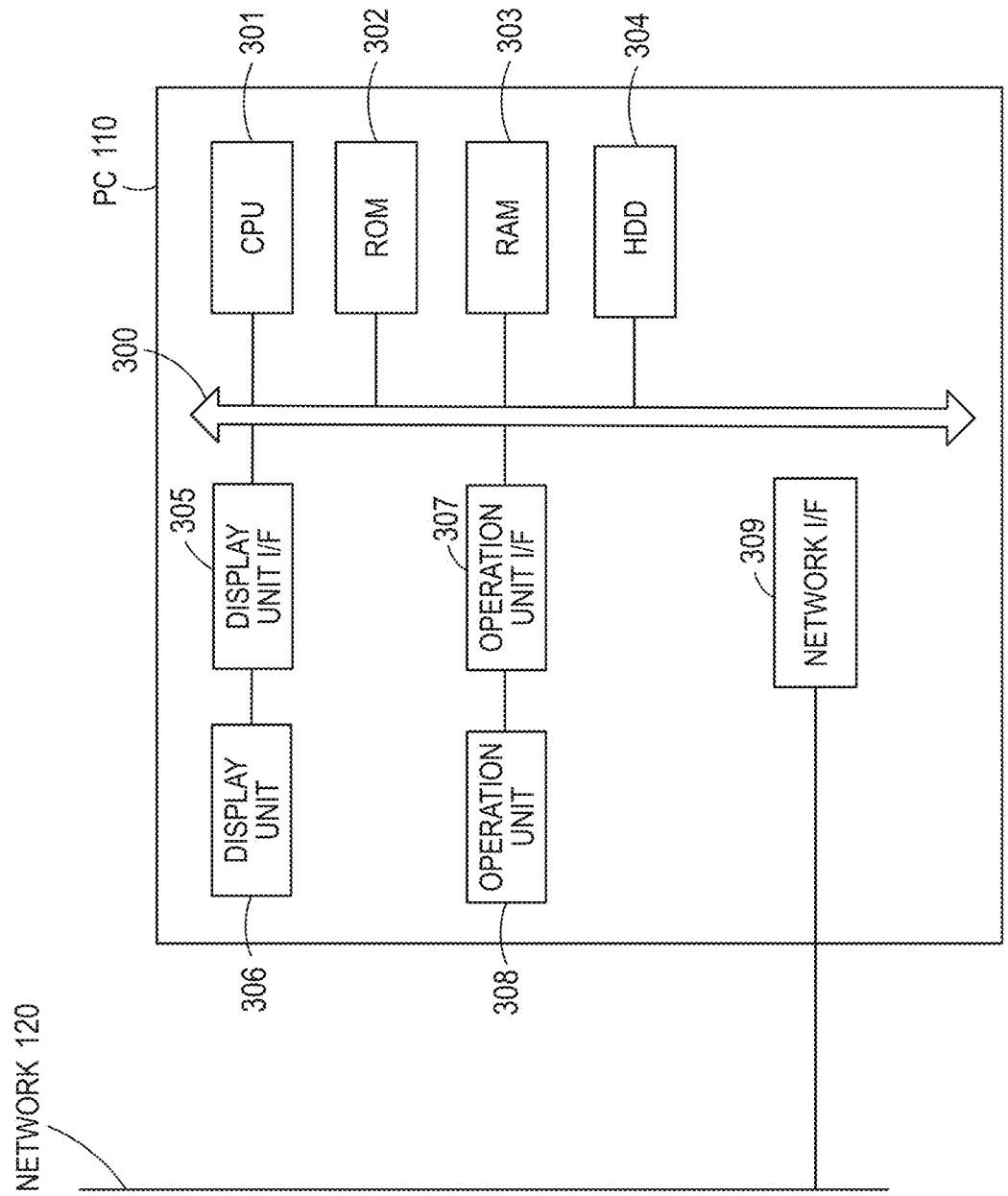
FIG. 3 shows a configuration of the personal computer according to the first embodiment.

Referring to FIG. 3, the configuration of PC 110 as an information processing apparatus will be described below. In the present embodiment, the PC is described as an information processing apparatus. However, the information processing apparatus may be another apparatus capable of processing print data, such as a handheld information communication terminal such as a smartphone.

The PC 110 includes a bus 300, a CPU 301, a ROM 302, a RAM 303, an HDD 304, a display unit I/F 305, a display unit 306, an operation unit I/F 307, an operation unit 308, and a network I/F 309. The CPU 301 reads out a control program stored in the ROM 302 and executes various processes for controlling the operation of the PC 110 as an information processing apparatus. The CPU 301 is connected to other units via a bus 300.

The ROM 302 stores a control program.

The RAM 303 is used as a temporary storage area such as a main memory and a work area of the CPU 301.

The HDD 304 stores data such as files.

The operation unit I/F 307 connects the operation unit 308 and the bus 300. The operation unit 308 includes a mouse and a keyboard. A user can input instructions and information to the PC 110 through the operation unit 308.

The display unit I/F 305 connects the display unit 306 and the bus 300. The display unit 306 includes a display. The user can view information output from the PC 110 via the display unit 306.

The network I/F 309 is connected to the network 120 and communicates with an external device through the network. The network I/F 309 transmits print data to an external device.

Creation of PDF Port Folio

Figure 4:
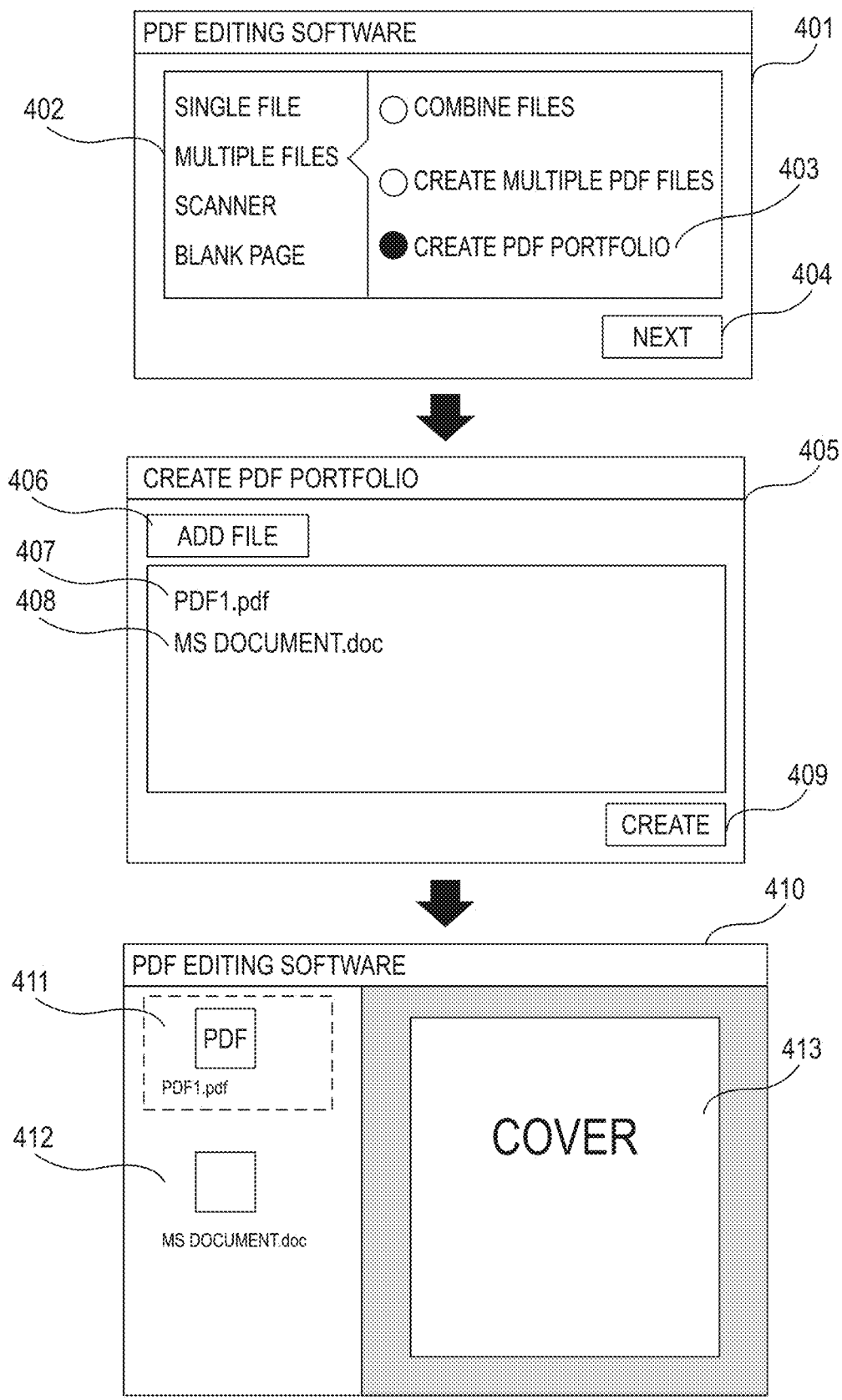
FIG. 4 shows a method of creating a PDF portfolio according to the first embodiment.

Referring to FIG. 4, a method of creating a PDF portfolio is described below.

The specifications of PDF and PDF portfolio are published. Accordingly, by creating a program or the like based on the specification, anyone can create a PDF portfolio. This disclosure describes a method of creating a PDF portfolio using software to edit a PDF.

FIG. 4 shows a user interface (UI) displayed when creating a PDF portfolio using software for editing a PDF.

When software 401 for editing a PDF is started and an item "multiple files" is selected from a menu 402, a menu 403 described as "create PDF portfolio" is displayed. When the menu 403 is selected and the "next" button is pressed, a dialog 405 described as "create PDF portfolio" is displayed.

When a button 406 described as "add file" in the dialog 405 is pressed, a screen for selecting files constituting the PDF portfolio is displayed. A user can select files prepared in advance to be added to a PDF portfolio. FIG. 4 shows an example of a screen after two files, i.e., a file 407 (PDF1.pdf) and a file 408 (MS document.doc) are added. The file 408

(MS document.doc) is an example of a file that is not a PDF file. That is, files other than PDF files can be added to the PDF portfolio.

When a "create" button 409 is pressed after all files are added, a PDF portfolio is created.

A screen 410 shows an example when the created PDF portfolio is opened by the PDF editing software. The left view indicates that the file 407 (PDF1.pdf) and the file 408 (MS document.doc) are included in the PDF portfolio (411, 412). In the example of the screen 410, a file 407 (PDF1.pdf) is selected. As a result, a preview of the file 407 (PDF1.pdf) is displayed on the preview screen 413.

(Structure of PDF Port Folio)

The structures of the PDF and PDF portfolio are described below with reference to FIG. 5A, FIG. 5B, and FIG. 6.

Figure 5A:
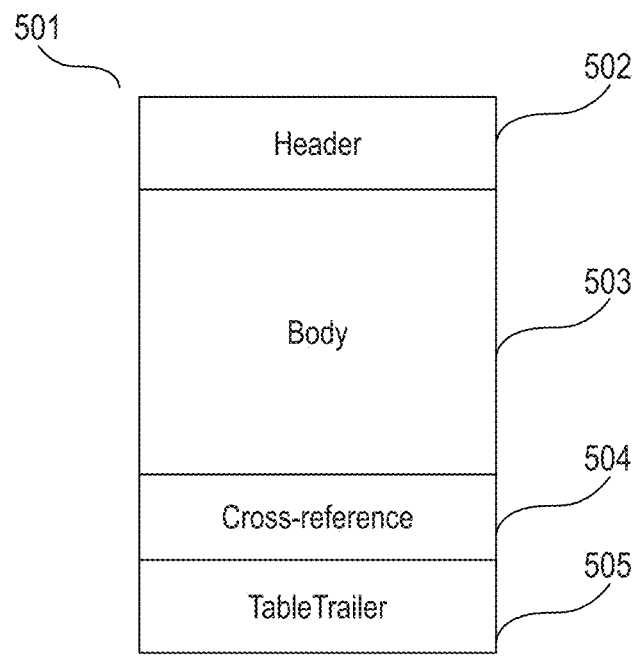
FIG. 5A shows a structure of a PDF according to the first embodiment.

FIG. 5A is a diagram showing a data structure of a PDF. The PDF consists of the following four components: Header 502, Body 503, Cross-reference 504, Table Trailer 505.

The Header 502 is an area in which version information or the like of the PDF is written.

The Body 503 is an area in which contents of a document are described. Multiple files are embedded in the Body 503 of the PDF portfolio.

The Cross-Reference 504 is an area in which an offset value for randomly accessing an object is written.

The Table Trailer 505 is an area in which information for accessing the Cross-Reference 504 and special objects is written.

Figure 5B:
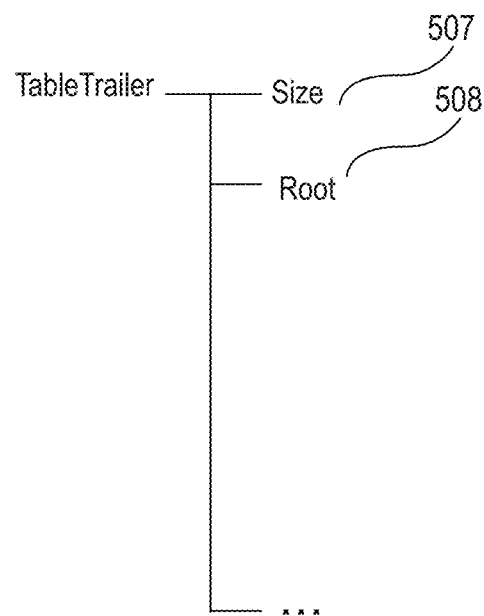
FIG. 5B shows a structure of a PDF according to the first embodiment.

FIG. 5B shows a part of key items described in the Table Trailer 505 using a tree structure.

Size 507 indicates the number of Cross-References.

The Root 508 indicates the top of the object hierarchy of the PDF. The PDF specification defines key items not shown in FIG. 5B. In FIG. 5B, the descriptions of these key items are omitted.

Figure 6:
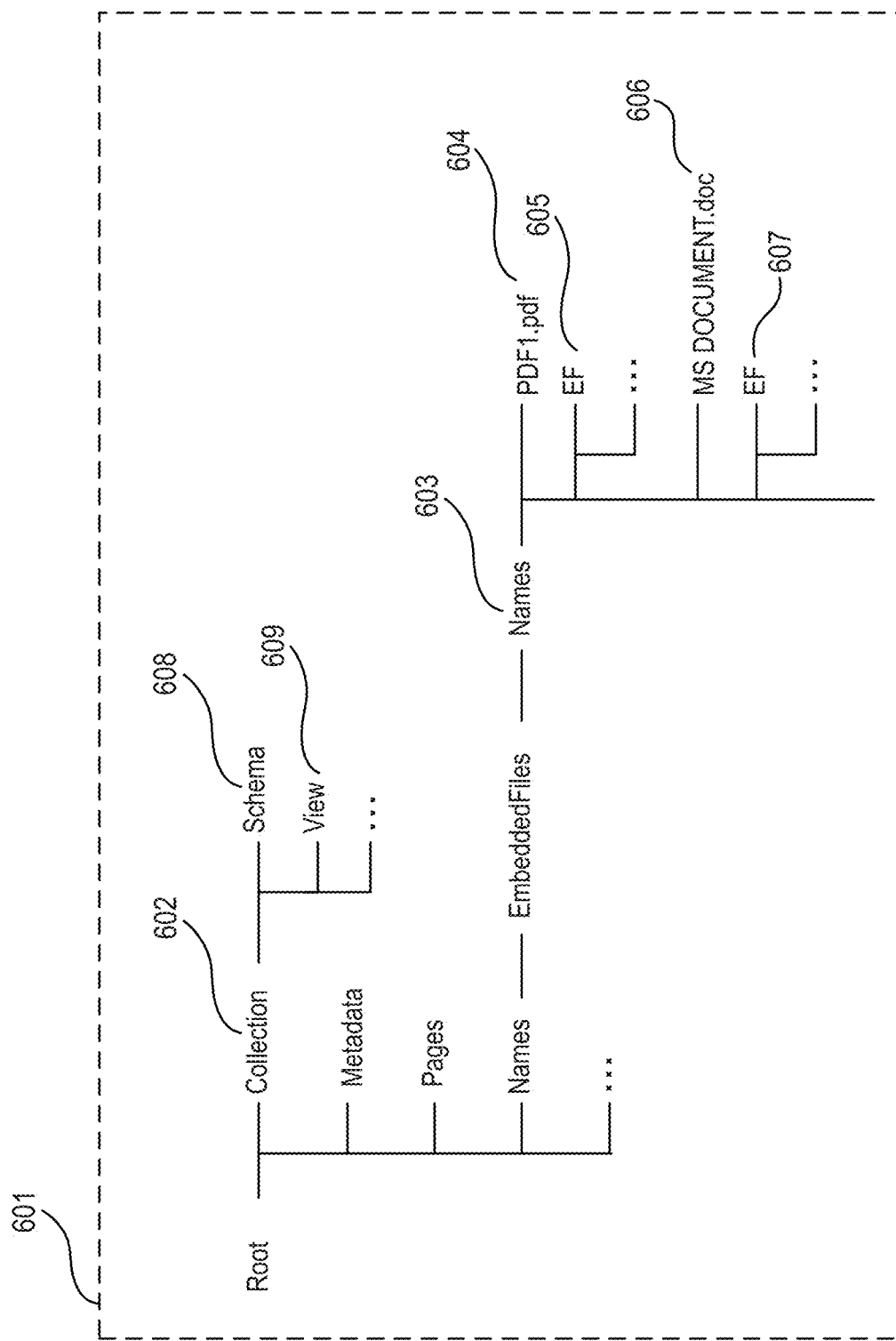
FIG. 6 shows a data structure of a PDF portfolio according to the first embodiment.

Referring to FIG. 6, a PDF portfolio including information of embedded files is described below.

A tree 601 of FIG. 6 is a tree structure showing key items included in the Root 508 of FIG. 5B in the PDF portfolio. The PDF specification defines key items not shown in FIG. 6. However, descriptions for these key items are omitted in FIG. 6.

In a case of a PDF portfolio, a key item Collection 602 is added in Root. In the Collection 602, information on display and/or organization of a PDF portfolio is mainly described.

For example, in a key item Schema 608, a field of a PDF portfolio is defined. The field is an item indicating attributes of a file such as a file name, a file creation date, and a file update date. If there is no key item Schema 608, a standard field is used. The key item Schema 608 allows to specify individual fields.

A key item View 609 is used to designate a display method of individual embedded files when the PDF portfolio is opened by a viewer of the PDF editing software. For example, the key item View 609 specifies a display method of the individual files 411, 412 shown in FIG. 4. In the example of FIG. 4, the individual files are displayed using icons. The key item View 609 allows a display mode of the file to be set to the detailed mode, the non-display mode, or the like.

Descriptions of other key items are omitted here.

In order to determine whether the PDF file is a PDF portfolio, the key item Collection 602 is checked.

The key item Names 603 (Root-Names-EmbeddedFiles-Names) describes information and a main body of multiple embedded files.

The key item Names 603 is an array. The number of key items Names 603 may vary depending on the number of embedded files.

For example, key items 604, 605 describe information of the file 407 (PDF1.pdf) which is one of embedded files. The key item 604 describes a file name. The key item 605 stores various kinds of information and a file body. Key items 606 and 607 are the same as the key items 604 and 605.

As described above, checking the information of the key item Names 603 allows to check contents of each file embedded in the PDF portfolio.

Recovery Process for Direct Printing

With reference to FIGS. 8A and 8B, the recovery process of in the present embodiment performed when direct printing of PDF data including a PDF portfolio function is executed will be described below.

Figure 2:
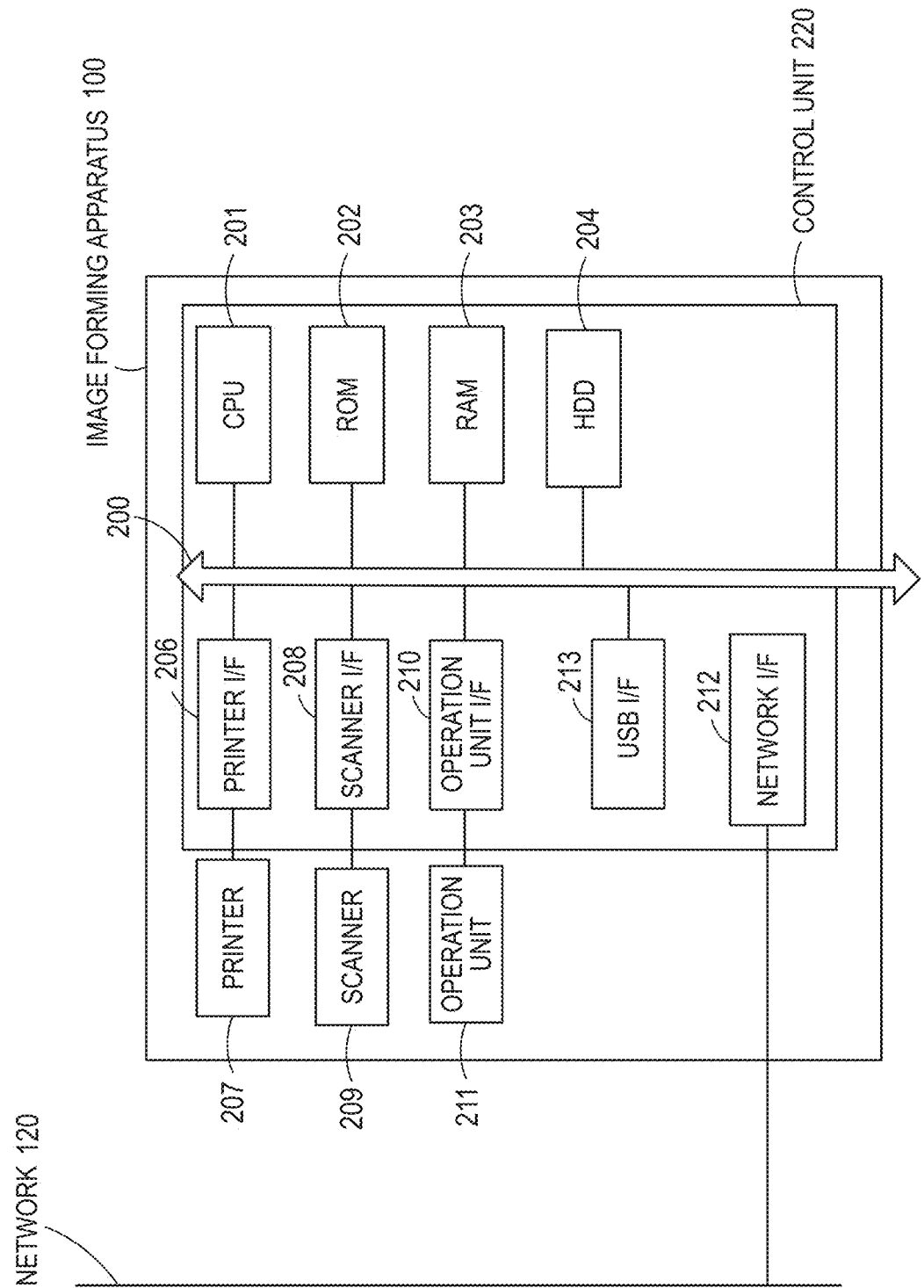
FIG. 2 shows a configuration of the image forming apparatus according to the first embodiment.

The processing shown in FIG. 8A is implemented by loading a program to be executed into the RAM 203 of FIG. 2, and causing the CPU 201 to execute the program. The processing shown in FIG. 8B is implemented by loading a program to be executed into the RAM 303 shown in FIG. 3 and causing the CPU 301 to execute the program.

(Processing of Image Forming Apparatus)

FIG. 8A shows a process flow executed by the image processing apparatus.

In step S801, the image forming apparatus starts processing for direct printing of PDF data including a PDF portfolio function.

In step S802, the CPU 201 receives PDF data to be printed, a data storage path, and information (user ID) for identifying a user from the PC 110 via the network I/F 212. In step S803, the CPU 201 stores the PDF data, the storage path, and the user ID in the RAM 203, and interprets the data to be printed.

In step S804, the CPU 201 determines whether or not the PDF data received in step S803 is a PDF portfolio. In addition, the CPU 201 determines whether or not the image forming apparatus can perform direct printing for the PDF portfolio.

The CPU 201 may check if there is the key item Collection 602 in the PDF to determine whether or not the PDF file is a PDF portfolio. If there is the key item Collection 602 in the PDF, the CPU 201 may determine that the PDF file is a PDF portfolio. If there is no key item Collection 602 in the PDF, the CPU 201 may determine that the PDF file is not a PDF portfolio.

Further, the CPU 201 can determine if the image forming apparatus can perform direct printing for the PDF portfolio based on whether or not the image forming apparatus is able to interpret the key item Collection 602 of the PDF in step S803. In a case that the image forming apparatus is able to interpret the key item Collection 602, the CPU 201 determines that the image forming apparatus can execute the direct printing. In a case that the image forming apparatus is not able to interpret the key item Collection 602, the CPU 201 determines that the image forming apparatus cannot execute the direct printing.

For example, in step S804, the CPU 201 determines whether or not the image forming apparatus can interpret the PDF portfolio based on version information of the print data interpreter of the image forming apparatus. In this embodiment, the print data interpreter of the image forming apparatus cannot interpret the PDF portfolio (i.e., cannot execute the direct printing), but an application compatible with the PDF portfolio installed in the PC can interpret the PDF portfolio.

When it is determined in step S804 that the PDF data is the PDF portfolio and the image forming apparatus cannot perform direct printing for the PDF portfolio (NO in step S804), the CPU 201 advances the processing to step S806. On the other hand, when it is determined in step S804 that the image forming apparatus can perform direct printing for the PDF portfolio (YES in step S804), the CPU 201 advances the processing to step S805.

In step S805, the CPU 201 performs direct printing, and advances the processing to step S807.

On the other hand, in step S806, the CPU 201 notifies, via the mail (FIG. 7A), the PC of information including notification (message) indicating that printing should be executed via the application compatible with the PDF portfolio and a command for opening the inputted PDF portfolio via the application, and then advances the processing to step S807.

The HDD 204 of the image forming apparatus 100 stores a list showing the correspondence between the user ID and the mail address. Thus, the CPU 201 can identify the mail address to be used for transmitting the mail via user authentication performed when the image forming apparatus is used by the user.

Finally, in step S807, the CPU 201 ends the processing performed by the image forming apparatus when the application compatible with the PDF portfolio is not installed.

(Processing of Information Processing Apparatus)

FIG. 8B shows a process flow executed by the information processing apparatus (PC).

In step S808, the CPU 301 of the PC starts processing for direct printing of PDF data including the PDF portfolio function.

In step S809, the CPU 301 receives a mail transmitted from the image forming apparatus, and advances the processing to step S810.

In step S810, the CPU 301 determines whether or not a command 705 attached to the mail has been executed.

When it is determined in step S810 that the command 705 attached to the mail has been executed (YES in step S810), the CPU 301 advances the processing to step S811. When it is determined in step S810 that the command 705 attached to the mail has not been executed (NO in step S810), the CPU 301 advances the processing to step S815 to end this processing.

In step S811, the CPU 301 determines whether or not the print data designated by the command 705 is stored in the PC. Specifically, in step S811, the CPU 301 determines whether a file is stored in a storage corresponding to a file path designated by the command 705. When there is no file in a storage corresponding to the designated file path (NO in step S811), the CPU 301 advances the processing to step S815 to end this processing.

When it is determined in step S811 that the print data is stored in the PC (YES in step S811), the CPU 301 advances the processing to step S812.

In step S812, the CPU 301 determines whether an application compatible with the PDF portfolio is installed. When it is determined in step S812 that the application compatible with the PDF portfolio is not installed (NO in step S812), the CPU 301 advances the processing to step S813. When it is determined that the application compatible with the PDF portfolio is installed (YES in step S812), the CPU 301 advances the processing to step S814. For example, the CPU 301 determines whether or not the application described in the first line of the command 705 shown in FIG. 7B is installed.

In step S813, the CPU 301 installs an application compatible with the PDF portfolio in the PC, and advances the processing to step S814. The process performed in step S813 corresponds to the execution of installing an application specified in the command 705 of FIG. 7B that is written below the description "else".

In step S814, the CPU 301 opens the PDF portfolio data by the application compatible with the PDF portfolio, and executes print processing. The processing performed in step S814 corresponds to executing the description written in the third to fourth lines of the command 705 of FIG. 7B. Then, the CPU 301 advances the processing to step S815.

In step S815, the CPU 301 of the PC ends the print execution process (and, if necessary, the application installation process) using the application compatible with the PDF portfolio.

The mail transmitted in step S806 is described below with reference to FIGS. 7A and 7B. The mail is a communication system for transmitting information such as documents and images over a computer communication network, and is also called an electronic mail or an e-mail. The mail of the present embodiment is not limited to communications using an e-mail or a short mail service, but includes information that can be used as a notification function or a processing history of an application or an operating system (OS).

Figure 7A:
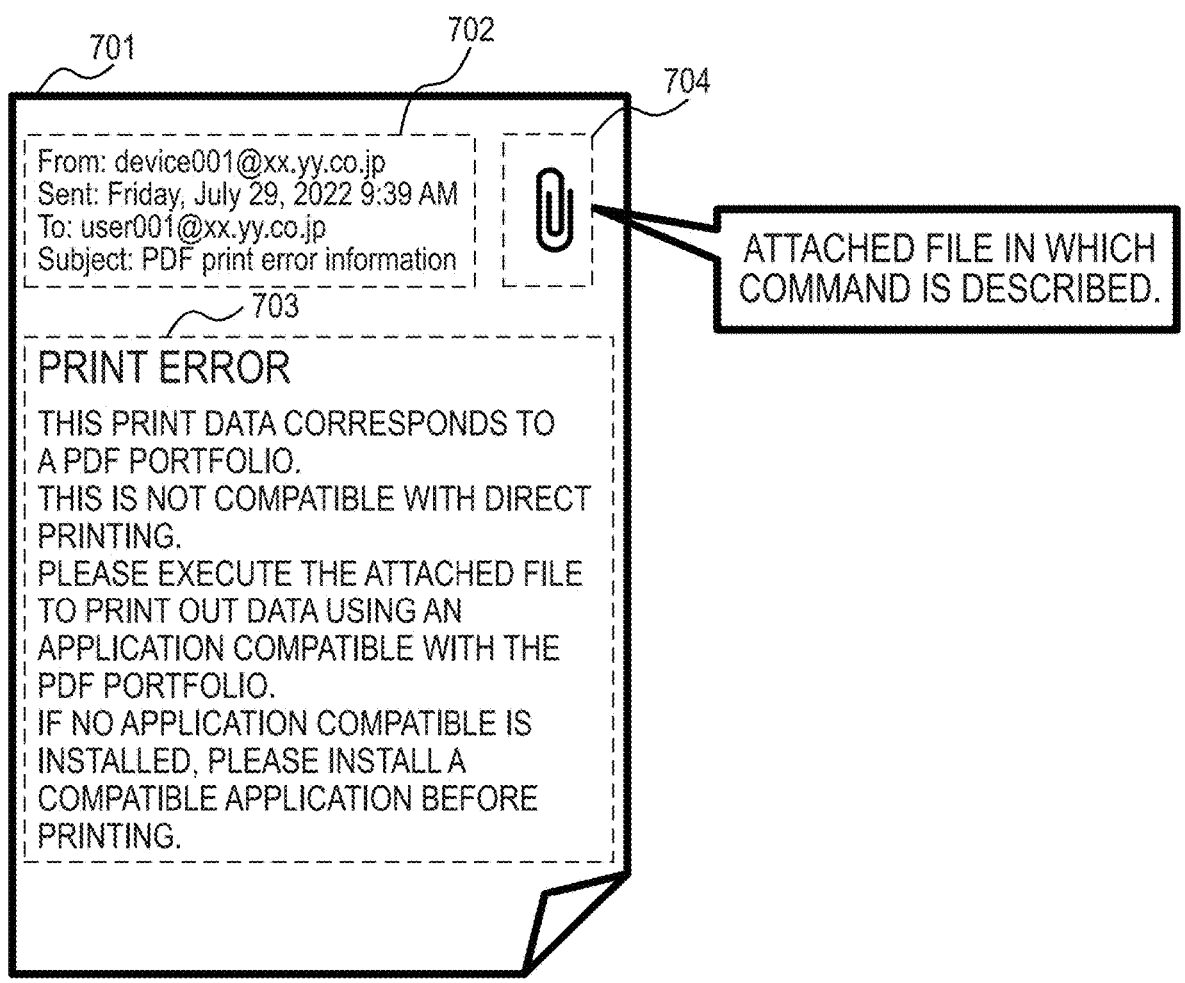
FIG. 7A shows an example of a mail transmitted from the image forming apparatus according to the first embodiment.

A mail 701 shown in FIG. 7A indicates the entire mail transmitted in step S806. The mail 701 includes a header 702 indicating transmission information, a body 703 for the user to check error information, and an attachment file 704 in which a command for performing the process of step S810 is described. FIG. 7B shows a command 705 described in the attachment. Executing an attachment file on the PC based on descriptions of the body allows a user to open the portfolio PDF and print data in a proper application. In a case that the application is not installed, the data is printed after the installation is executed.

Second Embodiment

In the first embodiment, the processing executed when an application compatible with the PDF portfolio is not installed is described.

Figure 9A:
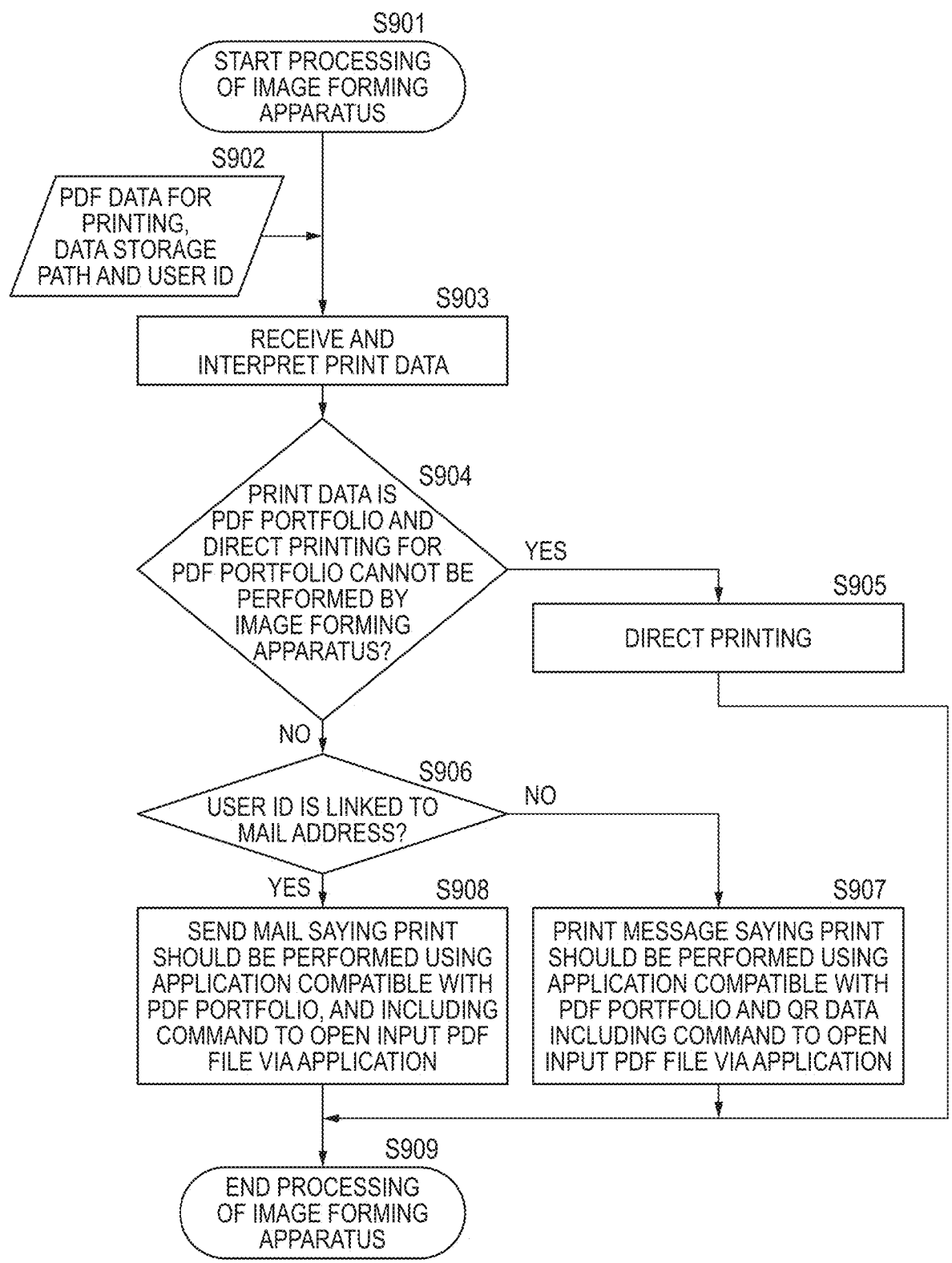
FIG. 9A shows processing executed by the image forming apparatus according to the second embodiment in a case where a user ID is not associated with a mail address.
Figure 9B:
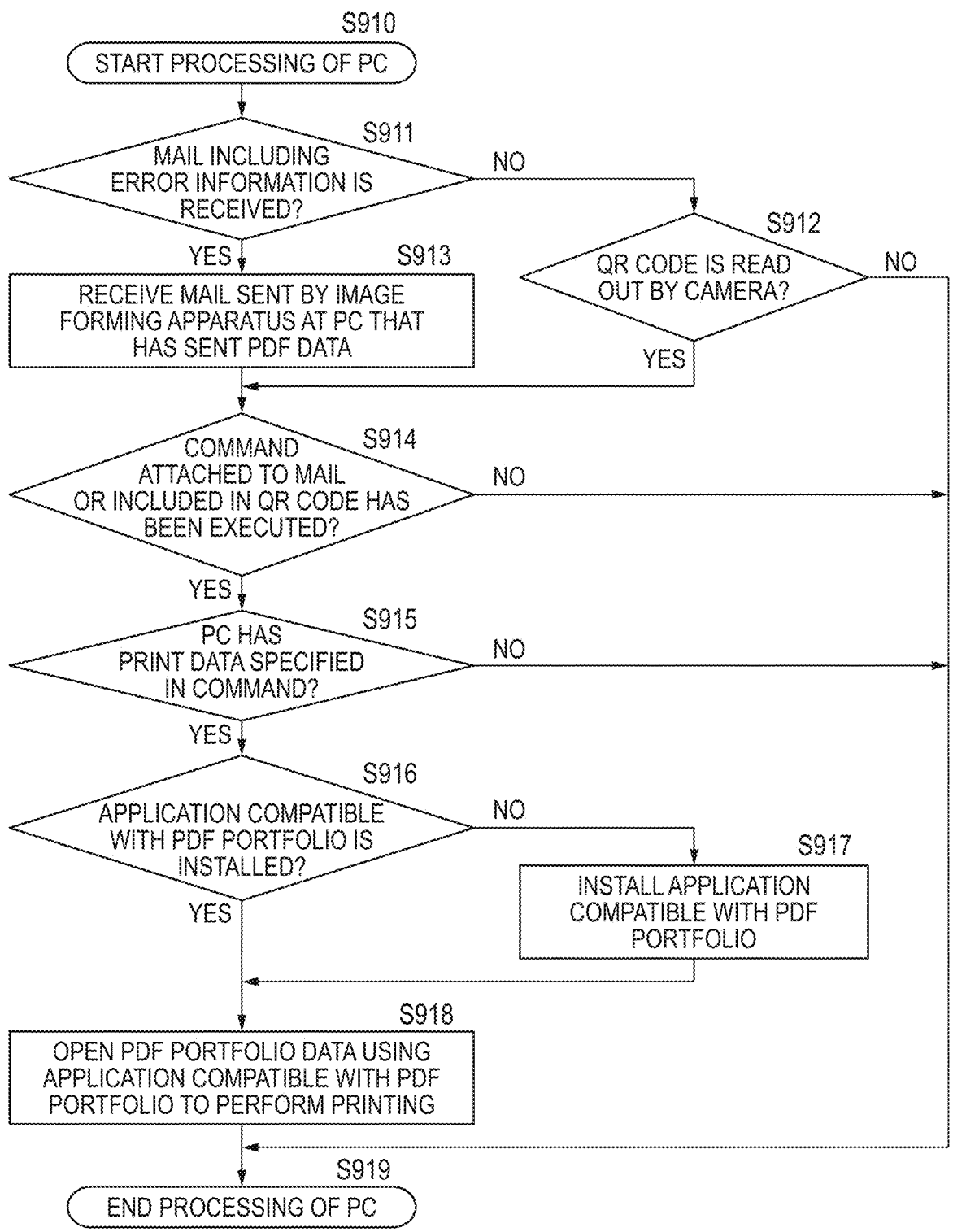
FIG. 9B shows processing executed by the personal computer according to the second embodiment in a case where a user ID is not associated with a mail address.

In the second embodiment, with reference to FIGS. 9A and 9B, the processing executed in a case where a user ID is not associated with a mail address is described.

The processing shown in FIG. 9A is implemented by loading a program to be executed into the RAM 203 of FIG. 2, and causing the CPU 201 to execute the program. The processing shown in FIG. 9B is implemented by loading a program to be executed in the RAM 303 shown in FIG. 3, and causing the CPU 301 to execute the program.

(Processing of Image Forming Apparatus)

FIG. 9A shows a process flow executed by the image processing apparatus. Steps S901 to S905, S908, and S909 shown in FIG. 9A are similar to steps S801 to S807 of FIG. 8A, respectively. In the present embodiment, steps S906 and S907 are newly added.

In step S901, the CPU 201 starts processing executed by the image forming apparatus to transmit a mail when a user ID is not associated with a mail address.

In step S902, the CPU 201 receives PDF data to be printed, a data storage path, and information (user ID) for identifying a user from the PC 110 via the network I/F 212. In step S903, the CPU 201 stores the PDF data, the storage path, and the user ID in the RAM 203, and interprets the data to be printed.

In step S904, the CPU 201 determines whether or not the PDF data received in step S903 is a PDF portfolio. In addition, the CPU 201 determines whether or not the image forming apparatus can perform direct printing for the PDF portfolio.

The CPU 201 may check if there is the key item Collection 602 in the PDF to determine whether or not the PDF file is a PDF portfolio. If there is the key item Collection 602 in the PDF, the CPU 201 may determine that the PDF file is a PDF portfolio. If there is no key item Collection 602 in the PDF, the CPU 201 may determine that the PDF file is not a PDF portfolio.

Further, the CPU 201 can determine if the image forming apparatus can perform direct printing for the PDF portfolio based on whether or not the image forming apparatus is able to interpret the key item Collection 602 of the PDF in step S903. In a case where the image forming apparatus is able to interpret the key item Collection 602, the CPU 201 determines that the image forming apparatus can execute direct printing. When the image forming apparatus is not able to interpret the key item Collection 602, the CPU 201 determines that the image forming apparatus cannot execute direct printing.

In the present embodiment, the print data interpreter of the image forming apparatus is not able to interpret the PDF portfolio (i.e., cannot execute direct printing), but an application compatible with the PDF portfolio installed in the PC can interpret the PDF portfolio.

When it is determined in step S904 that the PDF data is the PDF portfolio and the image forming apparatus cannot perform direct printing for the PDF portfolio (NO in step S904), the CPU 201 advances the processing to step S906. On the other hand, when it is determined in step S904 that the image forming apparatus can perform direct printing for the PDF portfolio (YES in step S904), the CPU 201 advances the processing to step S905.

In step S905, the CPU 201 performs direct printing. Then, the CPU 201 advances the processing to step S909 to end the process flow.

On the other hand, in step S906, the CPU 201 determines whether or not a user ID is associated with a mail address. When it is determined that the user ID is not associated with the mail address (NO in step S906), the CPU 201 advances the processing to step S907. When it is determined that the user ID is associated with the mail address (YES in step S906), the CPU 201 advances the processing to step S908.

In step S907, the CPU 201 causes the image forming apparatus to print information for notifying the user of a message indicating that printing should be executed via an application compatible with the PDF portfolio and a QR code (registered trademark) including a command for opening the inputted PDF portfolio via the application. Then, the CPU 201 advances the processing to step S909. In the present embodiment, a QR code is used but other types of code, such as a bar code, may be used to notify users of the information.

In step S908, the CPU 201 transmits, to the PC via mail (FIG. 7A), information including a message indicating that printing should be executed via an application compatible with the PDF portfolio and a command for opening the inputted PDF portfolio via the application. Then, the CPU 201 advances the processing to step S909.

The HDD 204 of the image forming apparatus 100 stores a list showing the correspondence between the user ID and the mail address. Thus, the CPU 201 can identify the mail address to be used for transmitting the mail via user authentication performed when the image forming apparatus is used by the user.

Finally, in step S909, the CPU 201 ends the processing executed by the image forming apparatus in a case where a user ID is not associated with a mail address.

(Processing of Information Processing Apparatus)

FIG. 9B shows a process flow executed by the information processing apparatus. Steps S910, S913, S915 to S919 shown in FIG. 9B are similar to steps S808 to S809, and S811 to S815 of FIG. 8B, respectively. In the present embodiment, steps S911 and S912 are newly added, and the process corresponding to step S810 is changed to step S914.

In step S910, the processing executed by the PC in a case where a user ID is not associated with the mail address is started.

In step S911, the CPU 301 determines whether or not error information has been received via mail. When it is determined that the error information has not been received (NO in step S911), the CPU 301 advances the processing to step S912. When it is determined that the error information has been received (YES in step S911), the CPU 301 advances the processing to step S913.

In step S912, the CPU 301 determines whether or not a QR code is read by a camera to acquire information. When it is determined in step S912 that information has been acquired (YES in step S912), the CPU 301 advances the processing to step S914. When it is determined in step S912 that information has not been acquired (NO in step S912), the CPU 301 advances the processing to step S919.

In step S913, the CPU 301 of the PC that has transmitted the PDF data acquires information from the mail transmitted by the image forming apparatus, and advances the processing to step S914.

In step S914, the CPU 301 determines whether or not the command 705 attached to the mail or the command included in the QR code has been executed.

When it is determined in step S914 that the command has been executed (YES in step S914), the CPU 301 advances the processing to step S915. When it is determined in step S914 that the command has not been executed (NO in step S914), the CPU 301 advances the processing to step S919.

In step S915, the CPU 301 determines whether print data specified by the command 705 or by the command included in the QR code is stored in the PC.

When it is determined that the print data specified by the command is stored in the PC (YES in step S915), the CPU 301 advances the processing to step S916. When it is determined that the print data specified by the command is not stored in the PC (NO in step S915), the CPU 301 advances the processing to step S919.

In step S916, the CPU 301 determines whether an application compatible with the PDF portfolio is installed. When it is determined in step S916 that an application compatible with the PDF portfolio is not installed (NO in step S916), the CPU 301 advances the processing to step S917. When it is determined that an application compatible with the PDF portfolio is installed (YES in step S916), the CPU 301 advances the processing to step S918.

In step S917, the CPU 301 installs an application compatible with the PDF portfolio in the PC, and advances the processing to step S918.

In step S918, the CPU 301 opens the PDF portfolio data by using the application compatible with the PDF portfolio, and executes printing. Then, the CPU 301 advances the processing to step S919.

Finally, in step S919, the CPU 301 of the PC ends the processing executed in a case where a user ID is not associated with a mail address.

Third Embodiment

In the second embodiment, the processing executed in a case where a user ID is not associated with a mail address is described.

Figure 10B:
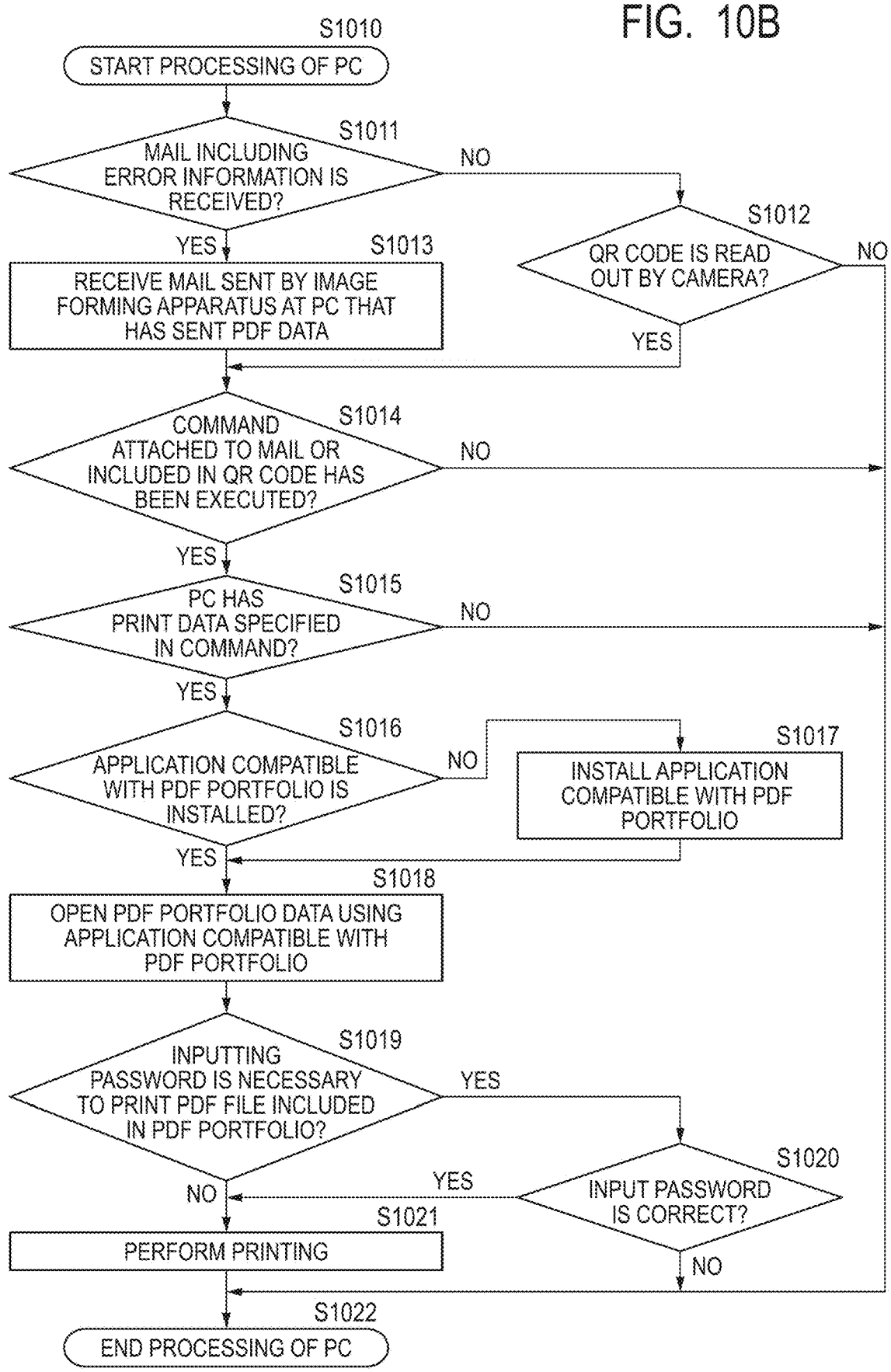
FIG. 10B shows a process executed by the personal computer according to the third embodiment in a case where a password is required for printing.

In the present embodiment, referring to FIGS. 10A and 10B, the process flow executed in a case where a password is required to print a PDF included in a PDF portfolio is described.

The processing shown in FIG. 10A is implemented by loading a program to be executed into the RAM 203 of FIG. 2, and causing the CPU 201 to execute the program. The processing shown in FIG. 10B is implemented by loading a program to be executed into the RAM 303 shown in FIG. 3 and causing the CPU 301 to execute the program.

(Processing of Image Forming Apparatus)

FIG. 10A shows a process flow executed by the image processing apparatus. Each step of FIG. 10A is basically the same as each step shown in FIG. 9A.

In step S1001, the processing executed by the image forming apparatus in a case where a password is required to print the PDF included in the PDF portfolio is started.

In step S1002, the CPU 201 receives PDF data to be printed, a data storage path, and information (user ID) for identifying a user from the PC 110 via the network I/F 212. In step S1003, the CPU 201 stores the PDF data, the storage path, and the user ID in the RAM 203, and interprets the data to be printed.

In step S1004, the CPU 201 determines whether or not the PDF data received in step S1003 is a PDF portfolio. In addition, the CPU 201 determines whether or not the image forming apparatus can perform direct printing for the PDF portfolio.

The CPU 201 may check if there is the key item Collection 602 in the PDF to determine whether or not the PDF file is a PDF portfolio. If there is the key item Collection 602 in the PDF, the CPU 201 may determine that the PDF file is a PDF portfolio. If there is no key item Collection 602 in the PDF, the CPU 201 may determine that the PDF file is not a PDF portfolio.

Further, the CPU 201 can determine if the image forming apparatus can perform direct printing for the PDF portfolio based on whether or not the image forming apparatus is able to interpret the key item Collection 602 in the PDF in step S1003. In a case where the image forming apparatus can interpret the key item Collection 602, the CPU 201 determines that the image forming apparatus can execute direct printing. In a case where the image forming apparatus is not able to interpret the key item Collection 602, the CPU 201 determines that the image forming apparatus cannot execute direct printing.

In the present embodiment, the print data interpreter of the image forming apparatus is not able to interpret the PDF portfolio (i.e., cannot execute direct printing), but an application compatible with the PDF portfolio installed in the PC can interpret the PDF portfolio.

When it is determined in step S1004 that the PDF data is the PDF portfolio and the image forming apparatus cannot perform direct printing for the PDF portfolio (NO in step S1004), the CPU 201 advances the processing to step S1006. On the other hand, when it is determined in step S1004 that the image forming apparatus can perform direct printing for the PDF portfolio (YES in step S1004), the CPU 201 advances the processing to step S1005.

In step S1005, the CPU 201 performs direct printing. Then, the CPU 201 advances the processing to step S1009 to end the process flow.

On the other hand, in step S1006, the CPU 201 determines whether or not a user ID is associated with a mail address. When it is determined that the user ID is not associated with the mail address (NO in step S1006), the CPU 201 advances the processing to step S1007. When it is determined that the user ID is associated with the mail address (YES in step S1006), the CPU 201 advances the processing to step S1008.

In step S1007, the CPU 201 causes the image forming apparatus to print a QR code (registered trademark) including a message indicating that printing should be executed via an application compatible with the PDF portfolio and a command for opening the inputted PDF portfolio via the application. Then, the CPU 201 advances the processing to step S1009.

In step S1008, the CPU 201 transmits, to the PC via a mail, information including a message indicating that printing should be executed via an application compatible with the PDF portfolio and a command for opening the inputted PDF portfolio via the application. Then, the CPU 201 advances the processing to step S1009.

The HDD 204 of the image forming apparatus 100 stores a list showing the correspondence between the user ID and the mail address. Thus, the CPU 201 can identify the mail address to be used for transmitting the mail via user authentication performed when the image forming apparatus is used by the user.

Finally, in step S1009, the CPU 201 ends the processing executed by the image forming apparatus in a case where a password is required to print the PDF included in the PDF portfolio.

(Processing of Information Processing Apparatus)

FIG. 10B shows a process flow executed by the information processing apparatus. Steps S1010 to S1018 and S1022 shown in FIG. 10B are similar to steps S910 to S918 and S919 shown in FIG. 9B, respectively. In the present embodiment, steps S1019 and S1020 are newly added.

In step S1010, processing executed by the PC in a case where a password is required to print the PDF is started.

In step S1011, the CPU 301 determines whether or not error information has been received via mail. When it is determined that the error information has not been received (NO in step S1011), the CPU 301 advances the processing to step S1012. When it is determined that the error information has been received (YES in step S1011), the CPU 301 advances the processing to step S1013.

In step S1012, the CPU 301 determines whether or not a QR code has been read by a camera. When it is determined in step S1012 that the QR code has been read (YES in step S1012), the CPU 301 advances the processing to step S1014. When it is determined in step S1012 that the QR code has not been read (NO in step S1012), the CPU 301 advances the processing to step S1022.

In step S1013, the CPU 301 of the PC that has transmitted the PDF data receives a mail transmitted by the image forming apparatus, acquires information included in the mail, and then advances the processing to step S1014.

In step S1014, the CPU 301 determines whether the command 705 attached to the mail or the command included in the QR code has been executed.

When it is determined in step S1014 that the command has been executed (YES in step S1014), the CPU 301 advances the processing to step S1015. When it is determined in step S1014 that the command has not been executed (NO in step S1014), the CPU 301 advances the processing to step S1022.

In step S1015, the CPU 301 determines whether print data specified by the command 705 or by the command included in the QR code is stored in the PC.

When it is determined that the print data specified by the command is stored in the PC (YES in step S1015), the CPU 301 advances the processing to step S1016. When it is determined that the print data specified by the command is not stored in the PC (NO in step S1015), the CPU 301 advances the processing to step S1022.

In step S1016, the CPU 301 determines whether an application compatible with the PDF portfolio is installed. When it is determined in step S1016 that an application compatible with the PDF portfolio is not installed (NO in step S1016), the CPU 301 advances the processing to step S1017. When it is determined that an application compatible with the PDF portfolio is installed (YES in step S1016), the CPU 301 advances the processing to step S1018.

In step S1017, the CPU 301 installs an application compatible with the PDF portfolio in the PC, and advances the processing to step S1018.

In step S1018, the CPU 301 opens the PDF portfolio data via the application compatible with the PDF portfolio. Then, the CPU 301 advances the processing to step S1019.

In step S1019, the CPU 301 determines whether the password is required to print the PDF included in the PDF portfolio. In a case where the password is not required to print the PDF (NO in step S1019), the CPU 301 advances the processing to step S1021. In a case where the password is required to print the PDF (YES in step S1019), the CPU 301 advances the processing to step S1020.

In step S1020, the CPU 301 determines whether or not an input password is correct. If determined that the input password is correct (YES in step S1020), the CPU 301 advances the processing to step S1021. If determined that the input password is not correct (NO in step S1020), the CPU 301 advances the processing to step S1022.

In step S1021, the CPU 301 executes printing, and advances the processing to step S1022.

In step S1022, the CPU 301 of the PC ends the processing executed in a case where a password is required to print the PDF included in the PDF portfolio.

Fourth Embodiment

In the third embodiment, the process flow executed in a case where a password is required to print a PDF included in a PDF portfolio is described.

In the present embodiment, a process flow executed in a case where the image forming apparatus can print only PDF data in the PDF portfolio will be described with reference to FIGS. 11A and 11B.

Figure 11A:
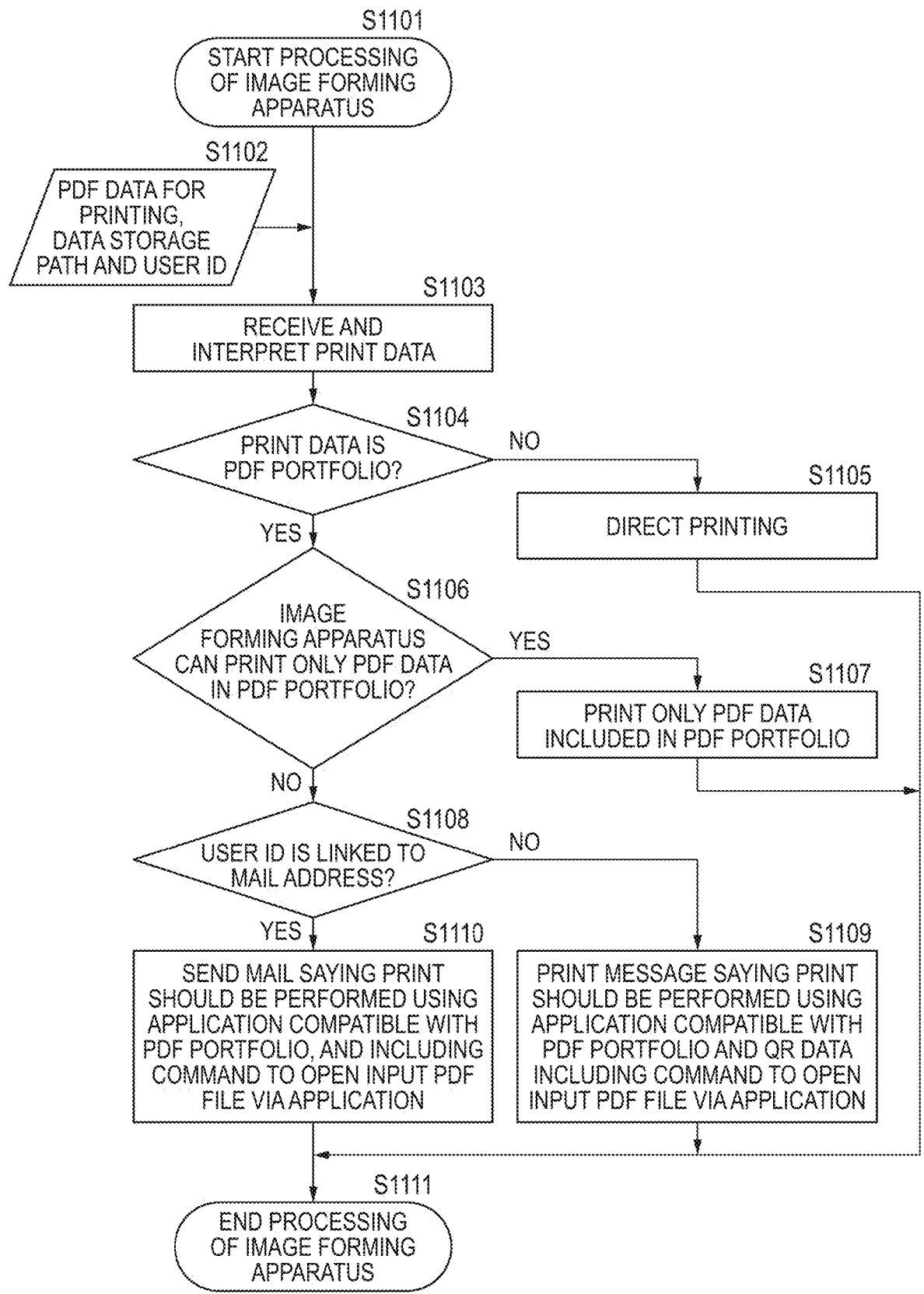
FIG. 11A shows processing executed by the image forming apparatus according to the fourth embodiment in a case where only PDF files in a portfolio are printed.

The processing shown in FIG. 11A is implemented by loading a program to be executed into the RAM 203 of FIG. 2, and causing the CPU 201 to execute the program. The processing shown in FIG. 11B is implemented by loading a program to be executed into the RAM 303 shown in FIG. 3 and causing the CPU 301 to execute the program.
(Processing of Image Forming Apparatus)

FIG. 11A shows a process flow executed by the image processing apparatus. Steps S1101 to S1105 and steps S1108 to S1111 shown in FIG. 11A are similar to steps S1001 to S1009 shown in FIG. 10A, respectively. In the present embodiment, steps S1106 and S1107 are newly added.

In step S1101, the CPU 201 of the image forming apparatus starts processing executed in a case where the image forming apparatus can print only the PDF in the PDF portfolio.

In step S1102, the CPU 201 receives PDF data to be printed, a data storage path, and information (user ID) for identifying a user from the PC 110 via the network I/F 212.

In step S1103, the CPU 201 stores the PDF data, the storage path, and the user ID in the RAM 203, and interprets the data to be printed.

In step S1104, the CPU 201 determines whether or not the PDF data received in step S1103 is a PDF portfolio.

CPU 201 may check if there is the key item Collection 602 in the PDF to determine whether or not the PDF file is a PDF portfolio. If there is the key item Collection 602 in the PDF, the CPU 201 may determine that the PDF file is a PDF portfolio. If there is no key item Collection 602 in the PDF, the CPU 201 may determine that the PDF file is not a PDF portfolio.

Further, the CPU 201 can determine if the image forming apparatus can perform direct printing for the PDF portfolio based on whether or not the image forming apparatus is able to interpret the key item Collection 602 in the PDF in step S1103. In a case where the image forming apparatus is able to interpret the key item Collection 602, the CPU 201 determines that the image forming apparatus can execute direct printing. In a case where the image forming apparatus is not able to interpret the key item Collection 602, the CPU 201 determines that the image forming apparatus cannot execute direct printing.

In the present embodiment, the print data interpreter of the image forming apparatus is able to interpret the PDF portfolio (i.e., the apparatus can execute direct printing).

When it is determined in step S1104 that the PDF data is a PDF portfolio (YES in step S1104), the CPU 201 advances the processing to step S1106. On the other hand, when it is determined in step S1104 that the PDF data is not the PDF portfolio (NO in step S1104), the CPU 201 advances the processing to step S1105.

In step S1105, the CPU 201 performs direct printing based on the print data, and advances the processing to step S1111.

In step S1106, the CPU 201 determines whether or not the image forming apparatus can print only the PDF data in the PDF portfolio.

The CPU 201 can determine if the image forming apparatus can execute printing of only the PDF data in the PDF portfolio based on whether or not the image forming apparatus is able to interpret the key item Collection 602 in the PDF in step S1103. In a case where the image forming apparatus is able to interpret the key item Collection 602, the CPU 201 determines that the image forming apparatus can print only the PDF data in the PDF portfolio. In a case where the image forming apparatus is not able to interpret the key item Collection 602, the CPU 201 determines that the image forming apparatus cannot print the PDF data in the PDF portfolio.

In the present embodiment, the print data interpreter of the image forming apparatus is able to interpret the key item Collection 602 (i.e., direct printing can be executed), and the application compatible with the PDF portfolio installed in the PC is able to interpret the key item Collection 602.

When it is determined that the image forming apparatus cannot print the PDF data in the PDF portfolio (NO in step S1106), the CPU 201 advances the processing to step S1108. When it is determined that the image forming apparatus can print only the PDF data in the PDF portfolio (YES in step S1106), the CPU 201 advances the processing to step S1107.

In step S1107, the CPU 201 prints only the PDF data in the PDF portfolio, and advances the processing to step S1111.

In step S1108, the CPU 201 determines whether or not a user ID is associated with a mail address. When it is determined that the user ID is not associated with the mail address (NO in step S1108), the CPU 201 advances the processing to step S1109. When it is determined that the user ID is associated with the mail address (YES in step S1108), the CPU 201 advances the processing to step S1110.

In step S1109, the CPU 201 causes the image forming apparatus to print a QR code (registered trademark) including a message indicating that printing should be executed via an application compatible with the PDF portfolio and a command for opening the inputted PDF portfolio via the application. Then, the CPU 201 advances the processing to step S1111.

In step S1110, the CPU 201 transmits, to the PC via mail, information including a message indicating that printing should be executed via an application compatible with the PDF portfolio and a command for opening the inputted PDF portfolio via the application. Then, the CPU 201 advances the processing to step S1111.

The HDD 204 of the image forming apparatus 100 stores a list showing the correspondence between the user ID and the mail address. Thus, the CPU 201 can identify the mail address to be used for transmitting the mail via user authentication performed when the image forming apparatus is used by the user.

In step S1111, the CPU 201 of the image forming apparatus ends the processing executed in a case where the image forming apparatus can print only the PDF data in the PDF portfolio.

(Processing of Information Processing Apparatus)

Figure 11B:
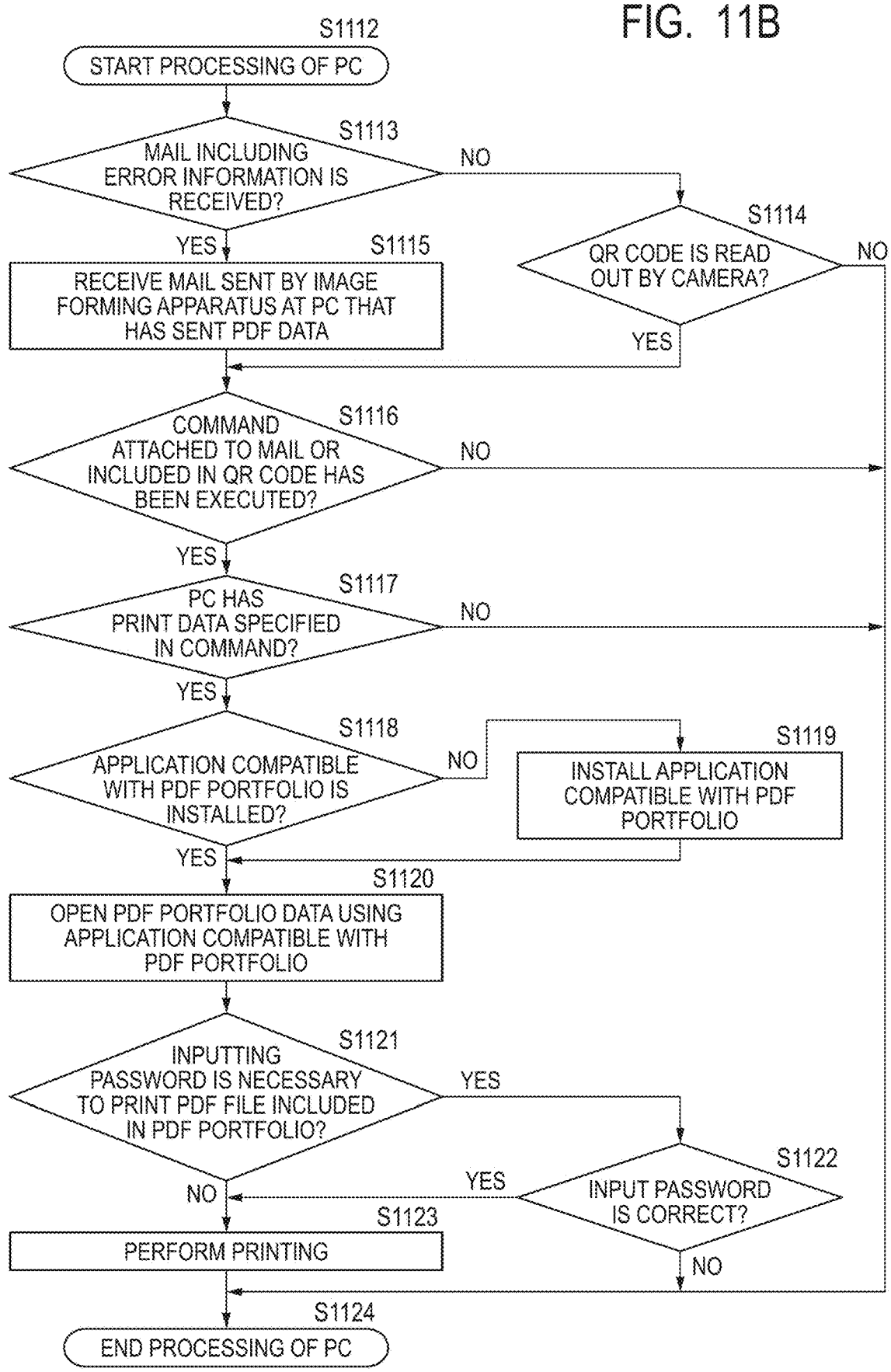
FIG. 11B shows processing of the image forming apparatus executed by the personal computer according to the fourth embodiment in a case where only PDF files in the portfolio is printed.

FIG. 11B shows a process flow executed by the information processing apparatus. Steps S1112 to S1124 shown in FIG. 11B are basically the same as steps S1010 to S1022 in FIG. 10B, respectively.

In step S1112, the CPU 301 of the PC starts the process executed in a case where the image forming apparatus can print only the PDF in the PDF portfolio.

In step S1113, the CPU 301 determines whether or not error information has been received via mail. When it is determined that the error information has not been received (NO in step S1113), the CPU 301 advances the processing to step S1114. When it is determined that the error information has been received (YES in step S1113), the CPU 301 advances the processing to step S1115.

In step S1114, the CPU 301 determines whether or not a QR code has been read by a camera. When it is determined in step S1114 that the QR code has been read (YES in step S1114), the CPU 301 advances the processing to step S11116. When it is determined in step S1114 that the QR code is not read (NO in step S1114), the CPU 301 advances the processing to step S1124.

In step S1115, the CPU 301 of the PC that has transmitted the PDF data receives a mail transmitted by the image forming apparatus, acquires information included in the mail, and then advances the processing to step S1116.

In step S1116, the CPU 301 determines whether the command 705 attached to the mail or the command included in the QR code has been executed.

When it is determined in step S1116 that the command has been executed (YES in step S1116), the CPU 301 advances the processing to step S1117. When it is determined in step S1116 that the command has not been executed (NO in step S1116), the CPU 301 advances the processing to step S1124.

In step S1117, the CPU 301 determines whether print data specified by the command 705 or by the command included in the QR code is stored in the PC.

When it is determined that the print data specified by the command is stored in the PC (YES in step S1117), the CPU 301 advances the processing to step S1118. When it is determined that the print data specified by the command is not stored in the PC (NO in step S1117), the CPU 301 advances the processing to step S1124.

In step S1118, the CPU 301 determines whether an application compatible with the PDF portfolio is installed. When it is determined in step S1118 that an application compatible with the PDF portfolio is not installed (NO in step S1118), the CPU 301 advances the processing to step S1119. When it is determined that an application compatible with the PDF portfolio is installed (YES in step S1118), the CPU 301 advances the processing to step S1120.

In step S1119, the CPU 301 installs an application compatible with the PDF portfolio in the PC, and then advances the processing to step S1120.

In step S1120, the CPU 301 opens the PDF portfolio data via the application compatible with the PDF portfolio. Then, the CPU 301 advances the processing to step S1121.

In step S1121, the CPU 301 determines whether a password is required to print the PDF included in the PDF portfolio. When the password is not required to print the PDF (NO in step S1121), the CPU 301 advances the processing to step S1123. When the password is required to print the PDF (YES in step S1121), the CPU 301 advances the processing to step S1122.

In step S1122, the CPU 301 determines whether or not the input password is correct. If determined that the input password is correct (YES in step S1122), the CPU 301 advances the processing to step S1123. If determined that the input password is not correct (NO in step S1122), the CPU 301 advances the processing to step S1124.

In step S1123, the CPU 301 executes printing, and then advances the processing to step S1124.

In step S1124, the CPU 301 of the PC ends the processing executed in a case where the image forming apparatus can print only the PDF data in the PDF portfolio.

Other Embodiments

Although various embodiments have been described in detail above, the present disclosure may be applied to a system including multiple devices, or may be applied to an apparatus including a single device. For example, the present disclosure is applicable to scanners, printers, PCs, copiers, multifunction peripherals, facsimile machines, and the like.

The present disclosure can also be achieved by supplying a software program that realizes the functions of the above-described embodiments to a system or apparatus directly or remotely, and causing a computer to read and execute the supplied program code.

Therefore, in order to implement the functions and processes of the present disclosure by a computer, the program code itself installed in the computer also implements the present disclosure. That is, the computer program itself can be used for implementing the above-described functions and processes according to one of the embodiments of the present disclosure.

In the above case, a style of the program may be anything such as an object code, a program executed by an interpreter, or script data supplied to an OS, as long as they function as the program.

The program may also be downloaded from an Internet/intranet website using a browser of a client computer. That is, the computer program itself of the present disclosure or a compressed file including an automatic installation function may be downloaded from the web site to a recording medium such as a hard disk.

The present disclosure can also be implemented by dividing the program code constituting the program of the present disclosure into multiple files and by downloading the files from different websites. That is, a WWW server that allows multiple users to download a program file for realizing the functional processing of the present disclosure using a computer may also become a constituent feature of the present disclosure.

Further, the program of the present disclosure may be encrypted, stored in a storage medium such as a CD-ROM, and distributed to users. In this case, only users who have satisfied predetermined conditions may download key information to decrypt encryption from a website via the Internet/intranet. The user may then decrypt and execute the program to install the program in a computer.

Various embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-200898, filed Dec. 16, 2022, which is hereby incorporated by reference herein in its entirety.

What is claimed is:

1. An image forming apparatus connected to an information processing apparatus via a network and capable of performing direct printing for PDF data, the image forming apparatus comprising:
   at least one memory that stores a program; and
   at least one processor that executes the program to perform:
   notifying a user of information via mail in a case where print data received from the information processing apparatus is a PDF portfolio and it is not possible to perform direct printing for the PDF portfolio using the image forming apparatus, the information including a message indicating that printing should be performed using an application compatible with the PDF portfolio and a command to open the PDF portfolio using the application.

2. The image forming apparatus according to claim 1, wherein the at least one processor executes the program to perform:
   printing a QR code including the information to notify the user in a case where a user ID of the user transmitting the print data is not associated with a mail address.

3. The image forming apparatus according to claim 1, wherein the at least one processor executes the program to perform:
   printing PDF data in a case where:
   the print data received from the information processing apparatus is a PDF portfolio;
   it is not possible to perform direct printing for the PDF portfolio using the image forming apparatus; and
   the PDF data can be printed using the image forming apparatus.

4. A method of controlling an image forming apparatus connected to an information processing apparatus via a network and capable of performing direct printing for PDF data, the method comprising:
   notifying a user of information via mail in a case where print data received from the information processing apparatus is a PDF portfolio and it is not possible to perform direct printing for the PDF portfolio using the image forming apparatus, the information including a message indicating that printing should be performed using an application compatible with the PDF portfolio and a command to open the PDF portfolio using the application.

* * * * *